US007222651B2

(12) United States Patent
Kaplan (10) Patent No.: US 7,222,651 B2
(45) Date of Patent: May 29, 2007

(54) TIRE FOR PREVENTING ROLLOVER OR OVERSTEER OF A VEHICLE

(75) Inventor: Steven D. Kaplan, Denver, CO (US)

(73) Assignee: TreadFx, LLC, Clayton, MO (US)

( * ) Notice: Subject to any disclaimer, the term of this patent is extended or adjusted under 35 U.S.C. 154(b) by 16 days.

(21) Appl. No.: 10/694,487

(22) Filed: Oct. 27, 2003

(65) Prior Publication Data

US 2005/0087276 A1    Apr. 28, 2005

(51) Int. Cl.
B60C 1/00 (2006.01)
B60C 11/00 (2006.01)
B60C 11/01 (2006.01)

(52) U.S. Cl. .............................. 152/209.5; 152/209.16; 152/525

(58) Field of Classification Search ............ 152/209.5, 152/209.16, 525; 156/110.1; 305/169
See application file for complete search history.

(56) References Cited

U.S. PATENT DOCUMENTS

| 3,155,135 A | | 11/1964 | Klenk ........................ 152/353 |
| 3,276,823 A | * | 10/1966 | Tucker, Jr. ................. 305/165 |
| 3,648,748 A | | 3/1972 | Lovell ........................ 152/353 |
| 3,853,164 A | | 12/1974 | Mirtain ................ 152/361 DM |
| 3,926,240 A | | 12/1975 | Nickerson, Jr. ............. 152/226 |
| 4,051,096 A | | 9/1977 | Koseki et al. ............. 260/31.8 |
| 4,152,186 A | * | 5/1979 | Shibata .................... 152/209.5 |
| 4,230,169 A | | 10/1980 | Boileau et al. ......... 152/353 R |
| 4,265,289 A | | 5/1981 | Pommier ................ 152/209 A |
| 4,385,653 A | | 5/1983 | Okazaki et al. ......... 152/209 R |
| 4,683,928 A | | 8/1987 | Yahagi .................... 152/209 R |
| 4,699,432 A | | 10/1987 | Klamer ........................ 301/5.3 |
| 4,863,650 A | | 9/1989 | Kohler et al. ................. 264/39 |
| 5,069,331 A | * | 12/1991 | Bartkowiak ................. 198/848 |
| 5,078,190 A | * | 1/1992 | Wissbrock et al. ......... 152/902 |
| 5,181,976 A | | 1/1993 | Iwafune et al. ......... 152/209 R |
| 5,207,847 A | * | 5/1993 | Tokieda et al. .......... 152/209.5 |
| 5,343,918 A | | 9/1994 | Fontaine ................. 152/209 A |
| 5,361,814 A | | 11/1994 | Covert et al. ........... 152/209 A |
| 5,540,489 A | * | 7/1996 | Muramatsu et al. ........ 305/197 |
| 6,036,800 A | * | 3/2000 | Corvasce et al. ........ 152/209.5 |
| 6,102,094 A | | 8/2000 | Matsumoto .............. 152/209.5 |
| 6,116,313 A | | 9/2000 | Costa Pereira et al. ..... 152/547 |
| 6,142,201 A | | 11/2000 | Harms ...................... 152/209.8 |
| 6,170,594 B1 | | 1/2001 | Gilbert ....................... 180/282 |
| 6,202,726 B1 | * | 3/2001 | Corvasce et al. ........... 152/517 |
| 6,247,512 B1 | | 6/2001 | Radulescu ............... 152/209.5 |
| 6,386,652 B1 | * | 5/2002 | Bonko ........................ 305/115 |
| 6,443,199 B1 | * | 9/2002 | Scarpitti et al. ......... 152/209.1 |
| 6,450,223 B1 | * | 9/2002 | Landers et al. .......... 152/209.5 |
| 6,523,585 B1 | | 2/2003 | Ducci et al. .............. 152/152.1 |
| 6,540,858 B1 | | 4/2003 | Caretta et al. ........... 156/110.1 |

(Continued)

FOREIGN PATENT DOCUMENTS

JP    61-7348    *    1/1986

(Continued)

*Primary Examiner*—Steven D. Maki
(74) *Attorney, Agent, or Firm*—Wilmer Cutler Pickering Hale and Dorr LLP (57) ABSTRACT

A tire for preventing vehicle rollover or oversteer comprises a pair of bead portions, a pair of sidewall portions, a tread portion extending between the pair of sidewall portions, and a portion of low friction material positioned along an edge of the tread portion.

18 Claims, 11 Drawing Sheets

U.S. PATENT DOCUMENTS

| | | |
|---|---|---|
| 6,588,799 B1 | 7/2003 | Sanchez ..................... 280/755 |
| 6,591,879 B1 | 7/2003 | Beckmann et al. ......... 152/153 |
| 6,761,198 B2 * | 7/2004 | Zanzig et al. ............ 152/209.5 |

FOREIGN PATENT DOCUMENTS

| | | | |
|---|---|---|---|
| JP | 63-218413 | * | 9/1988 |
| JP | 02-197403 A | | 8/1990 |
| JP | 03-246177 A | | 11/1991 |
| JP | 03-246177 A | | 11/1991 |
| JP | 4-71833 | * | 3/1992 |
| JP | 4-126610 | * | 4/1992 |
| JP | 4-159109 | * | 6/1992 |

* cited by examiner

TIRE FOR PREVENTING ROLLOVER OR OVERSTEER OF A VEHICLE

BACKGROUND OF THE INVENTION

This invention relates to a tire for controlling the motion and stability of a vehicle, and more particularly, to a tire for preventing rollover or oversteer of a vehicle.

Sports Utility Vehicles (SUV's), pickup trucks, and vans are popular vehicles for transporting individuals, equipment, and supplies. Typically these vehicles have a high center of gravity that tends to lead to a rollover condition if the driver of the vehicle does not properly control the vehicle. The interaction between a vehicle's tire and the roadway during an emergency maneuver is such that the vehicle is steered severely at moderate to high speeds generating lateral frictional forces that then cause the tire(s) to deflect and tuck under the wheel rim. During the steer, high lateral frictional forces develop between the tires and the road, creating a roll moment about the leading tires (i.e., the left side tires for a right hand steer) potentially leading to rollover of the vehicle. It is imperative to avoid rollover of the vehicle because rollover can lead to damage to the vehicle and injury or death to vehicle occupants.

Until now, there has not been any tire employed or available for reducing the frictional forces induced when a vehicle is steered at moderate to high speeds in order to prevent vehicle rollover or oversteer of the vehicle. The present invention is designed to obviate and overcome many of the disadvantages and shortcomings associated with presently available tires. In particular, the present invention is for preventing vehicle rollover or oversteer by introducing a low-friction surface on the tire shoulder or the tire sidewall to reduce side forces being generated during a severe steer. The use of a low-friction surface increases the ability of the vehicle to remain upright. Moreover, the tire of the present invention does not alter the tread of the tire and therefore does not affect the braking or handling of the vehicle during other modes of operation or driving of the vehicle. Further, the present invention may be used to modify existing tires.

SUMMARY OF THE INVENTION

In one form of the present invention, a tire for preventing rollover or oversteer of a vehicle comprises a pair of bead portions, a pair of sidewall portions, a tread portion extending between the pair of sidewall portions, and a portion of low friction material positioned along an edge of the tread portion.

In another form of the present invention, a tire for preventing rollover or oversteer of a vehicle comprises a pair of bead portions, a pair of sidewall portions, a tread portion toroidally extending between the pair of sidewall portions, the tread portion having a shoulder comprised of low friction material and one of the sidewall portions having a portion of low friction material.

In still another form of the present invention, a tire for preventing rollover or oversteer of a vehicle comprises a pair of bead portions, a pair of sidewall portions, a tread portion toroidally extending between the pair of sidewall portions, the tread portion having a pair of opposed shoulders with each of the shoulders having a portion of low friction material.

In another form of the present invention, a tire for preventing rollover or oversteer of a vehicle comprises a pair of bead portions, a pair of sidewall portions, a tread portion toroidally extending between the pair of sidewall portions, the tread portion having a pair of opposed shoulders with each of the shoulders having a portion of low friction material, and the sidewall portions each having a portion of low friction material.

In yet another form of the present invention, a tire for preventing rollover or oversteer of a vehicle comprises a pair of bead portions, a pair of sidewall portions, a tread portion extending between the pair of sidewall portions, a portion of low friction material positioned along an edge of the tread portion, and each of the sidewall portions having a portion of low friction material.

In still another form of the present invention, a tire for preventing rollover or oversteer of a vehicle comprises a pair of bead portions, a pair of sidewall portions, a tread portion toroidally extending between the pair of sidewall portions, and one of the sidewall portions having a portion of low friction material.

In light of the foregoing comments, it will be recognized that a principal object of the present invention is to provide an improved tire that is capable of preventing vehicle oversteer or a rollover situation.

Another object of the present invention is to provide a tire for preventing vehicle rollover or oversteer that is of simple construction and design and which can be easily employed with highly reliable results.

Another object of the present invention is to provide a tire for preventing vehicle rollover or oversteer that increases stability of the vehicle during an emergency situation or maneuver.

A further object of the present invention is to provide a tire for preventing vehicle rollover or oversteer that can be mounted to a vehicle and used as a conventional tire.

Another object of the present invention is to provide a tire for preventing vehicle rollover or oversteer that is constructed to withstand abuse and friction.

A still further object of the present invention is to provide a tire for preventing vehicle rollover or oversteer that does not have a tire tread that is altered from a conventional tire.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
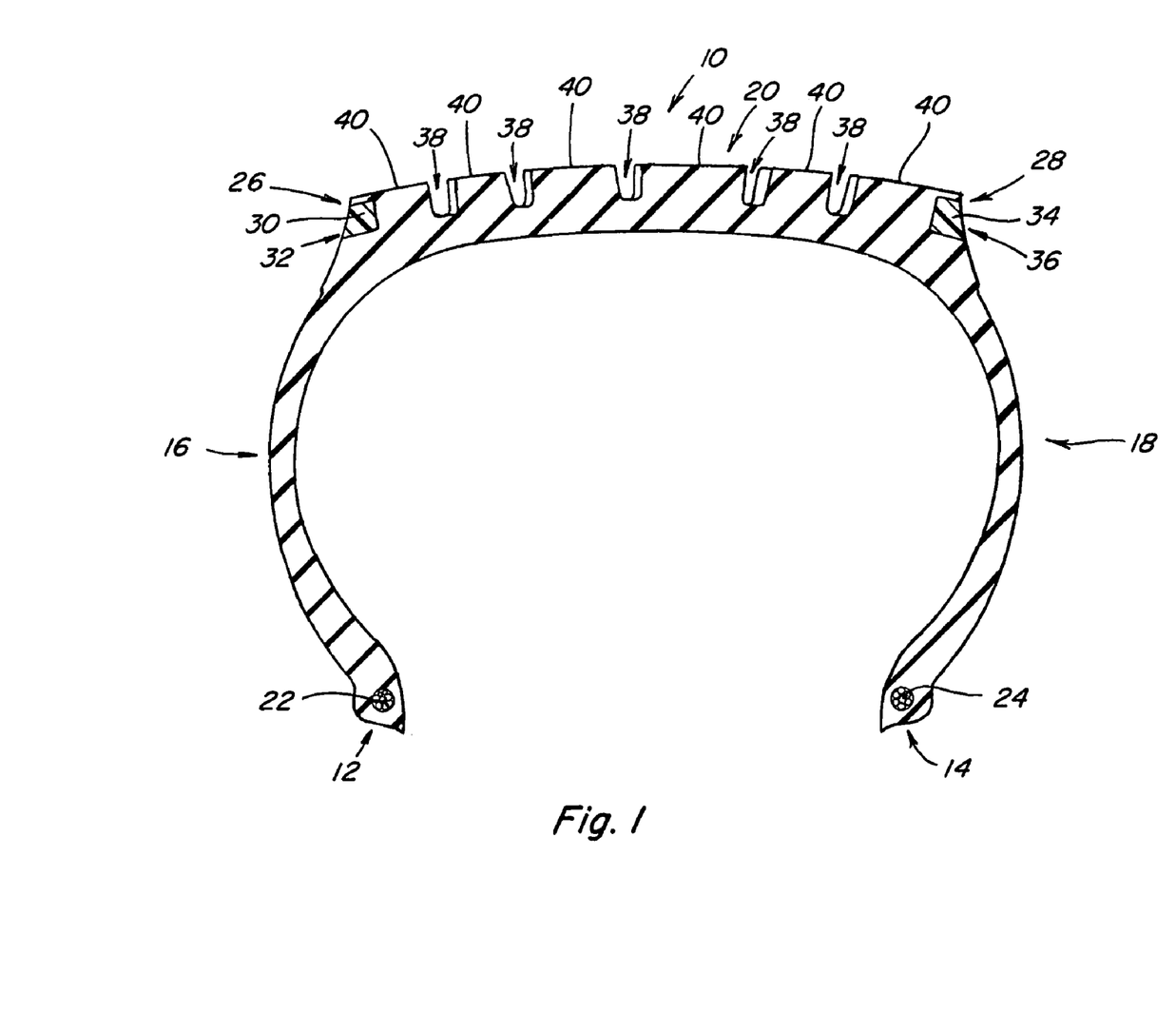
FIG. 1 is a cross-sectional view of a preferred embodiment of a tire for preventing vehicle rollover or oversteer constructed according to the present invention.

Referring now to the drawings, wherein like numbers refer to like items, number 10 identifies a preferred embodiment of a tire for preventing vehicle rollover or oversteer constructed according to the present invention. Referring now to FIG. 1, the tire 10 is shown in cross-section having a pair of bead portions 12 and 14, a pair of sidewall portions 16 and 18, and a tread portion 20 toroidally extending between the sidewall portions 16 and 18. The tire 10 may also include a bead core 22 embedded in the bead portion 12 and a bead core embedded in the bead portion 14. The tread 20 has a pair of axially opposed shoulders 26 and 28. The tire 10 also comprises a portion 30 of low friction material that is positioned in the shoulder 26 of the tread 20. The portion 30 has a surface 32 that is capable of contacting a road surface (not shown). The tire 10 may also comprise a portion 34 of low friction material that is positioned in the shoulder 28 of the tread 20. The portion 34 also has a surface 36 that is capable of contacting a road surface (not shown). The sidewall portion 16 may be an outboard side of the tire 10 and the sidewall portion 18 may be an inboard side of the tire 10. The position of the tire 10 may be reversed, in that sidewall portion 16 may be the inboard side and sidewall portion 18 may be the outboard side, depending upon where the tire 10 is mounted on a vehicle. Further, it is also possible to have only the portion 30 and not include the portion 34 as part of the tire 10.

Although not shown, the tire 10 may further include other components such as a belt or belts, belt plies, plies, cords, and an air impermeable liner. The tread portion may include grooves 38 and ribs 40. The grooves 38 and the ribs 40 may take on any known tread pattern or tread design. The ribs 40 that form the side surface are separated from a central region of the tread by a circumferentially extending groove. The low friction material is spaced from the tread surface by a distance that is less than the depth of the circumferentially extending groove.

Figure 2:
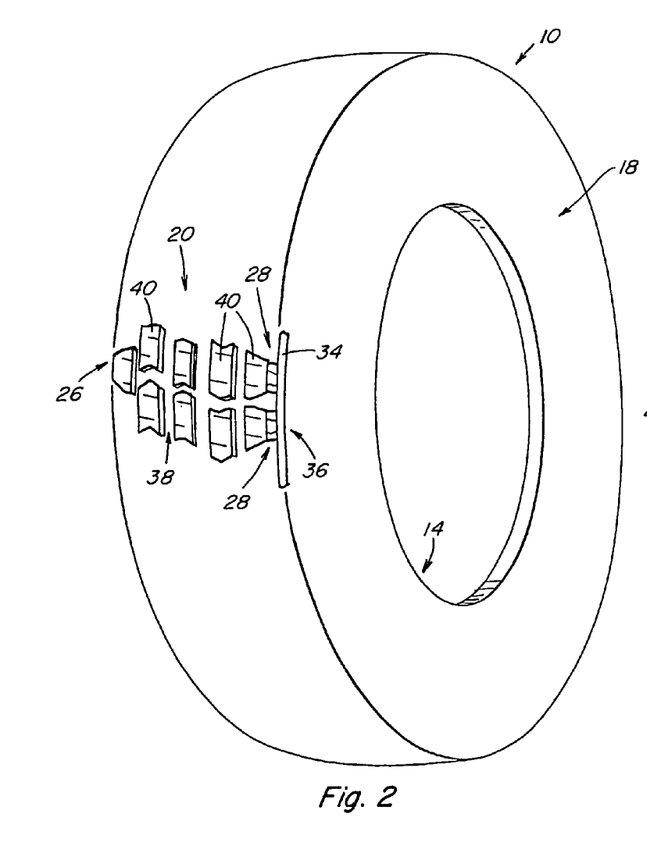
FIG. 2 is a perspective view of a preferred embodiment of a tire for preventing vehicle rollover or oversteer constructed according to the present invention with only a portion of the tread shown.

With reference now to FIG. 2, a perspective view of the tire 10 is illustrated with only a portion of the tread 20 being shown. The tread portion 20 has the shoulder 26 and the axially opposed shoulder 28. The shoulder 28 is shown to comprise the portion 34 of low friction material being positioned in the shoulder 28 of the tread 20. The portion 34 may be an annular ring that is molded into the shoulder 28 or attached to the shoulder 28. The portion 34 has a surface 36 that is capable of contacting the road to reduce frictional forces between the tire and the road to prevent vehicle rollover or oversteer. Although not shown, the tire 10 may also have the portion 30 on the shoulder 26.

Figure 3:
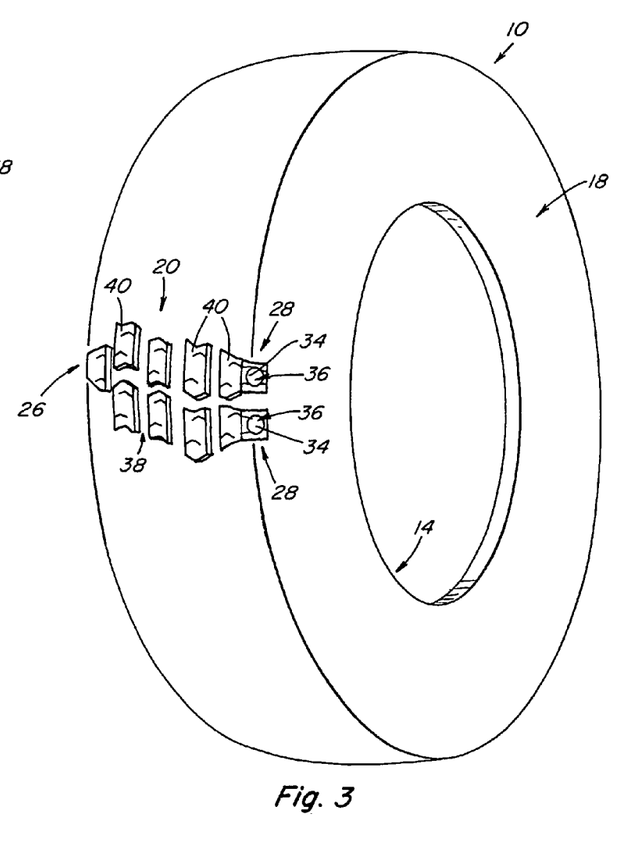
FIG. 3 is a perspective view of another preferred embodiment of a tire for preventing vehicle rollover or oversteer constructed according to the present invention with only a portion of the tread shown.
Figure 4:
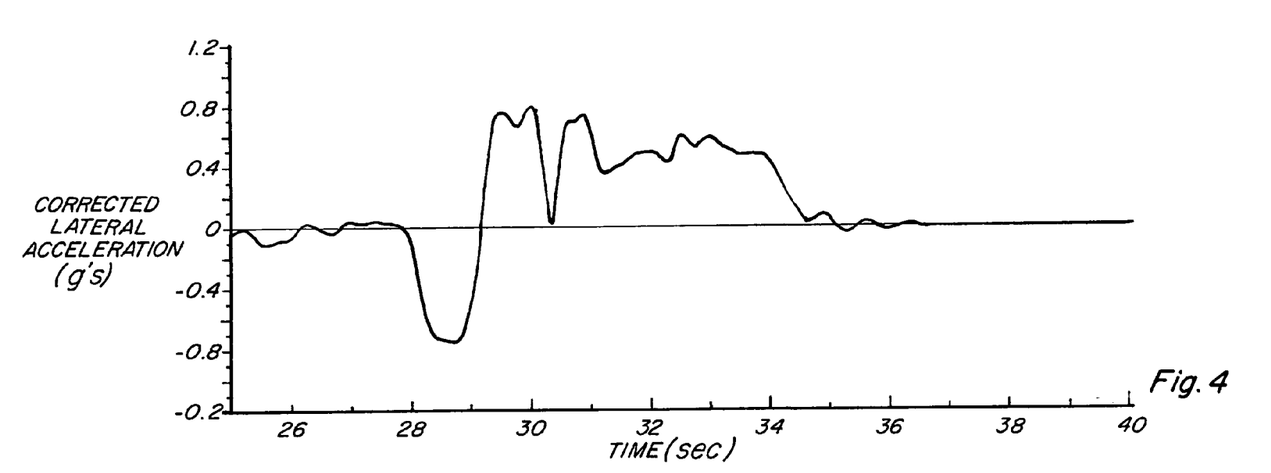
FIG. 4 is a graphical representation of the measured corrected lateral acceleration of a test vehicle fitted with four conventional tires.
Figure 5:
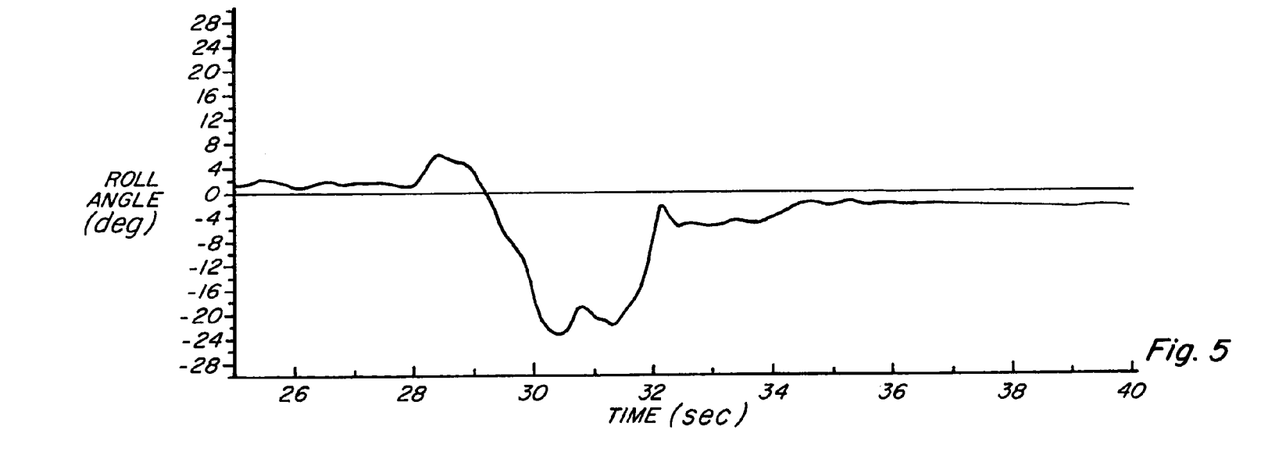
FIG. 5 is a graphical representation of the measured roll angle of a test vehicle fitted with four conventional tires.
Figure 6:
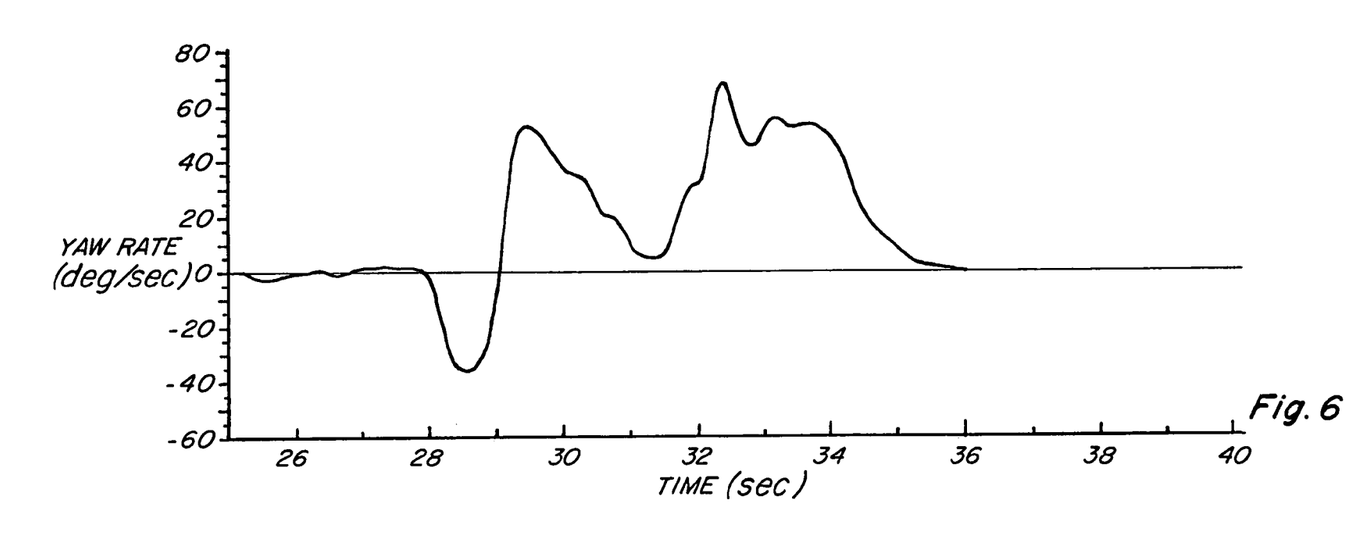
FIG. 6 is a graphical representation of the measured yaw rate of a test vehicle fitted with four conventional tires.
Figure 7:
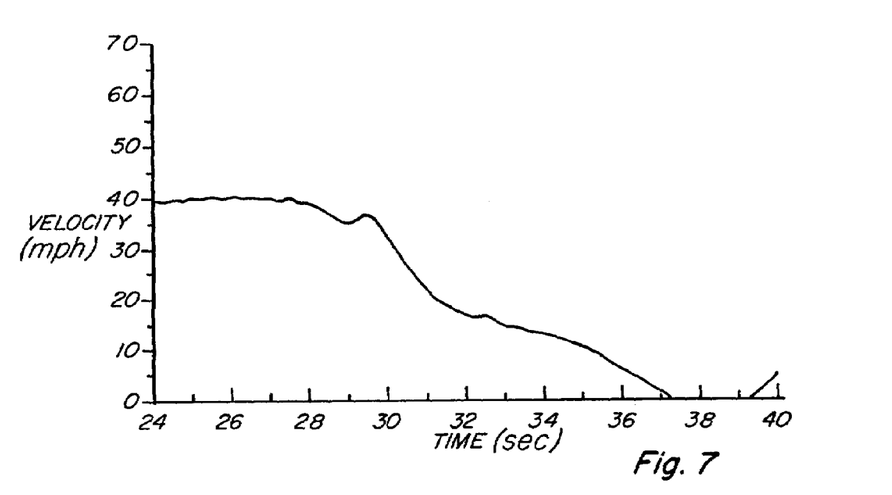
FIG. 7 is a graphical representation of the measured velocity of a test vehicle fitted with four conventional tires.
Figure 8:
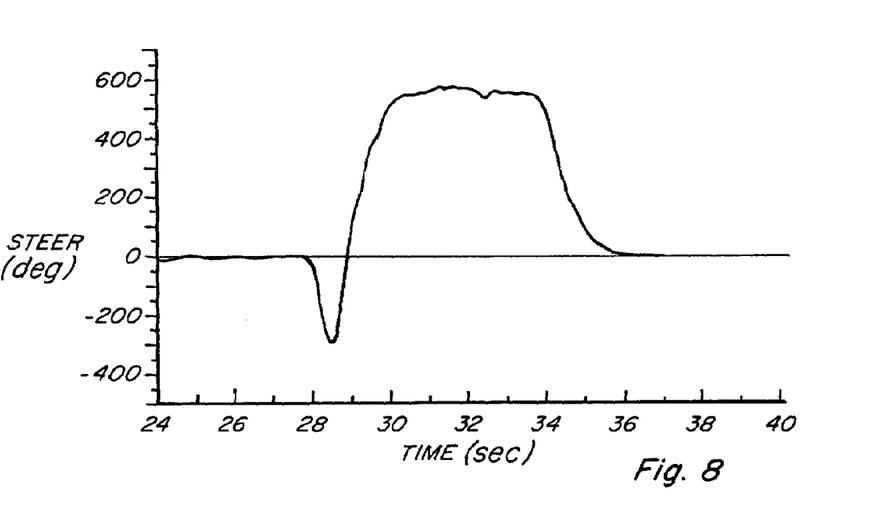
FIG. 8 is a graphical representation of the measured steer of a test vehicle fitted with four conventional tires.
Figure 9:
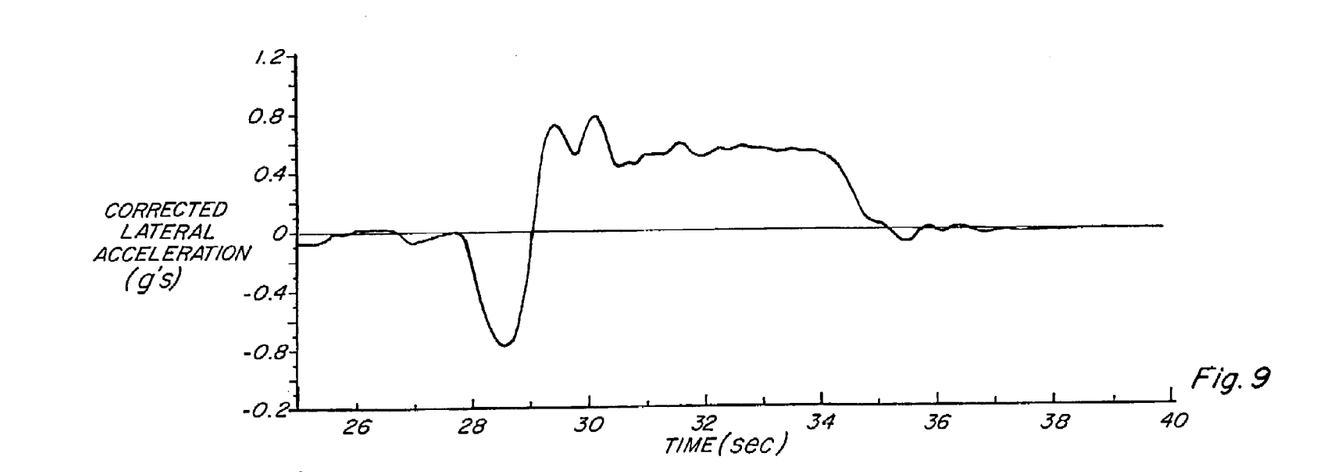
FIG. 9 is a graphical representation of the measured corrected lateral acceleration of a test vehicle fitted with one of the tires constructed according to the present invention.
Figure 10:
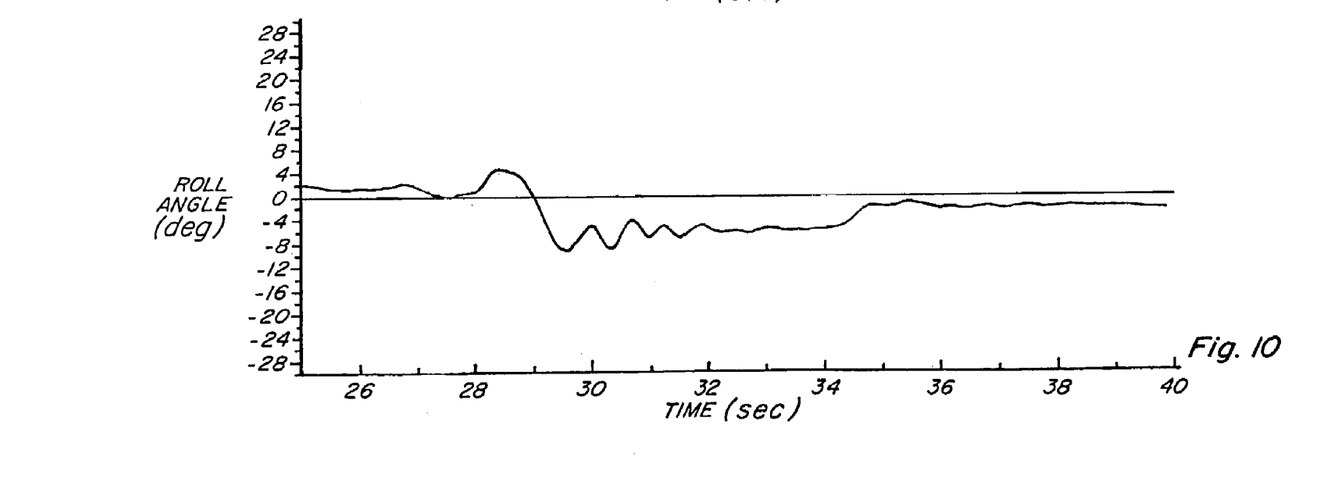
FIG. 10 is a graphical representation of the measured roll angle of a test vehicle fitted with one of the tires constructed according to the present invention.
Figure 11:
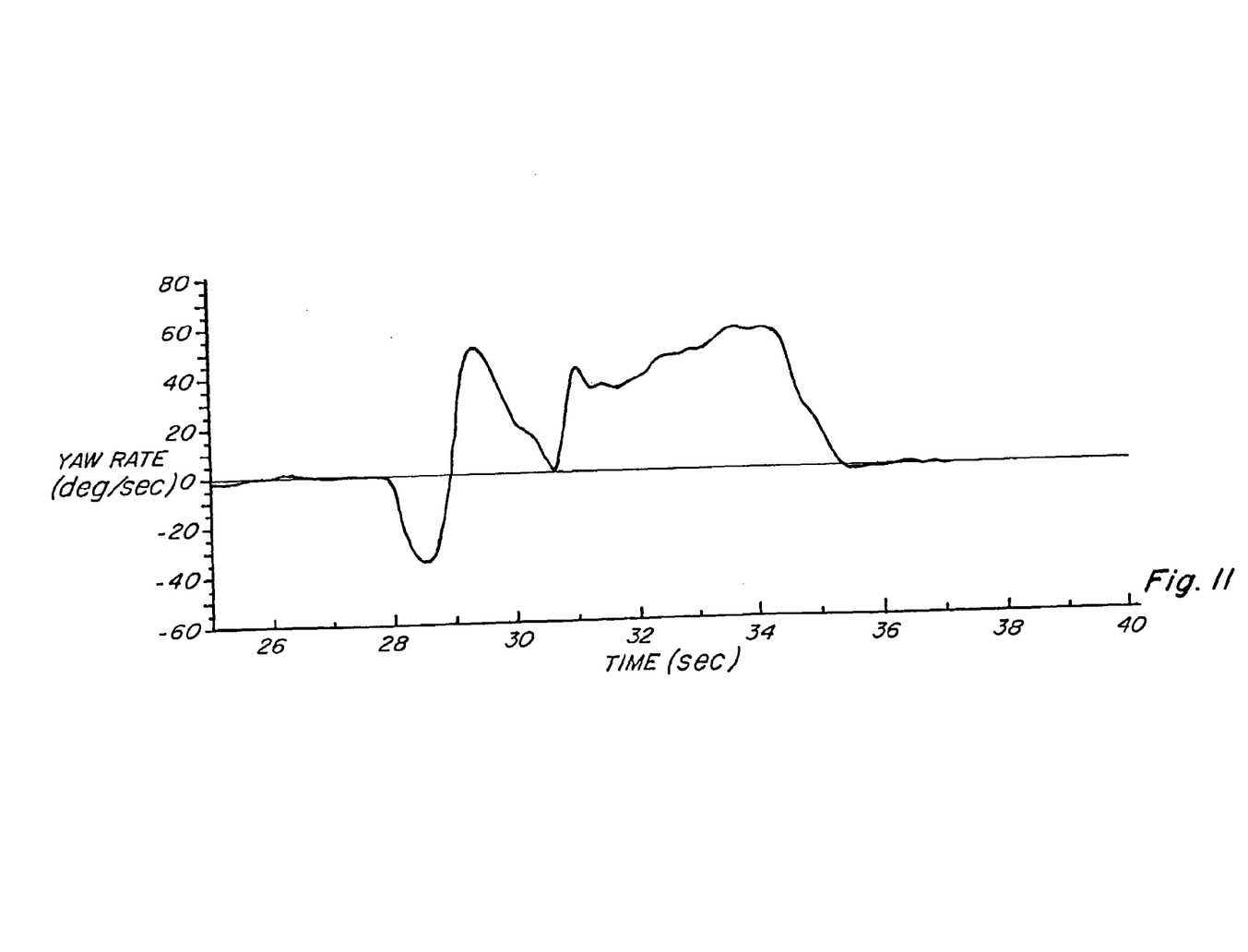
FIG. 11 is a graphical representation of the measured yaw rate of a test vehicle fitted with one of the tires constructed according to the present invention.
Figure 12:
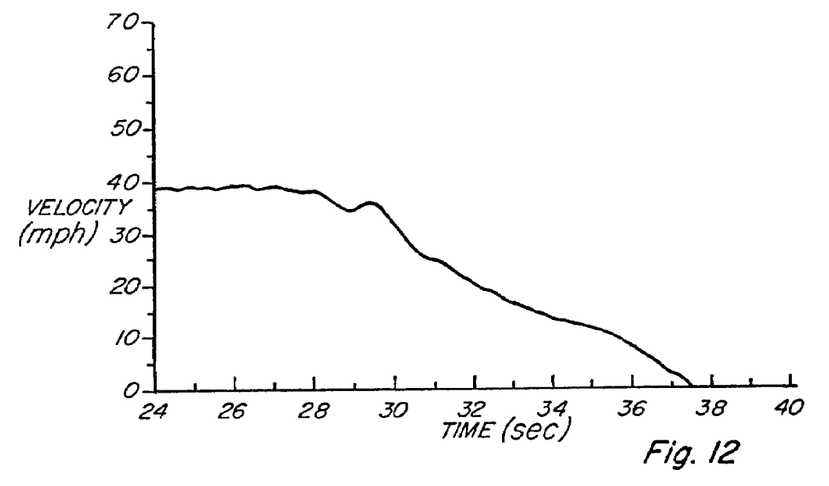
FIG. 12 is a graphical representation of the measured velocity of a test vehicle fitted with one of the tires constructed according to the present invention.
Figure 13:
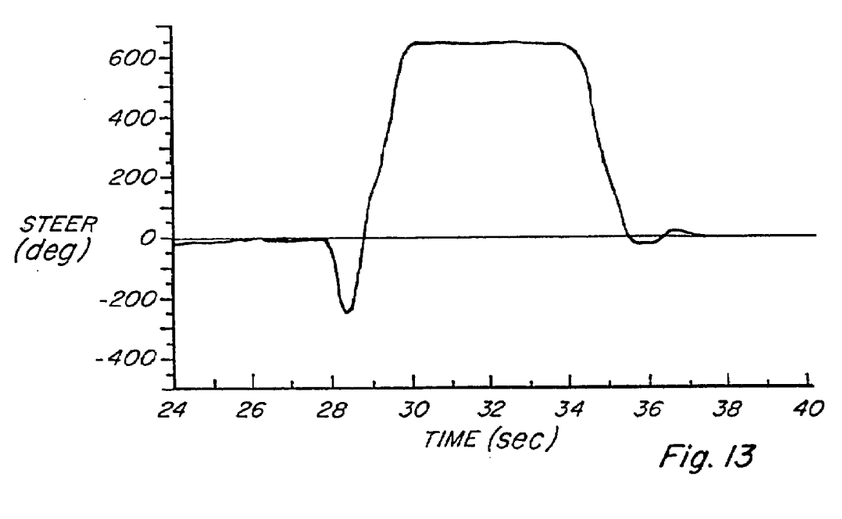
FIG. 13 is a graphical representation of the measured steer of a test vehicle fitted with one of the tires constructed according to the present invention.
Figure 14:
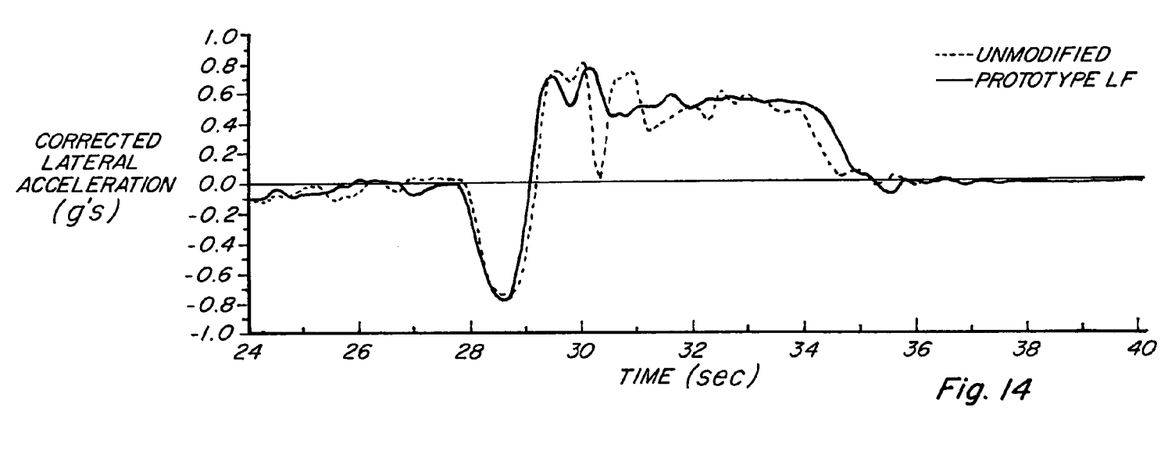
FIG. 14 is a graphical representation of the compared measured corrected lateral acceleration of a test vehicle fitted with four conventional tires versus a test vehicle fitted with one of the tires constructed according to the present invention.
Figure 15:
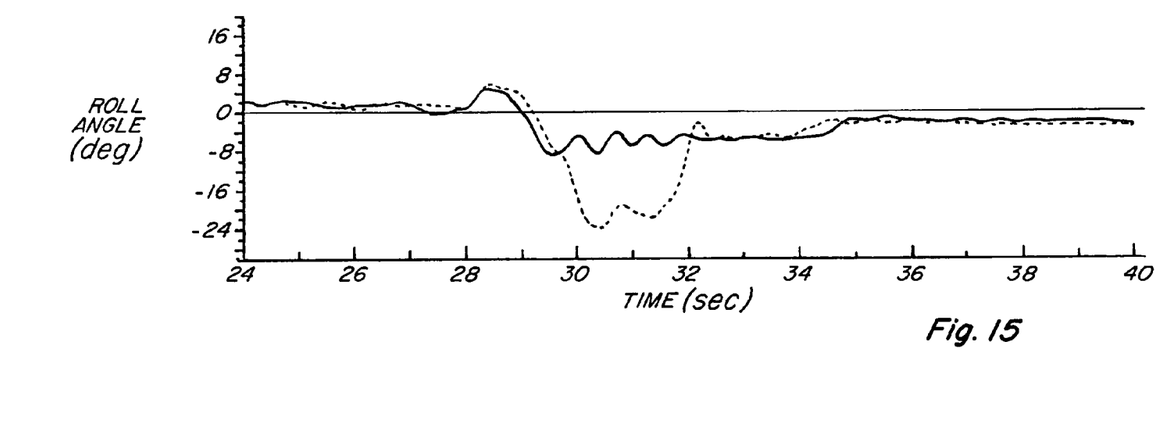
FIG. 15 is a graphical representation of the compared measured roll angle of a test vehicle fitted with four conventional tires versus a test vehicle fitted with one of the tires constructed according to the present invention.
Figure 16:
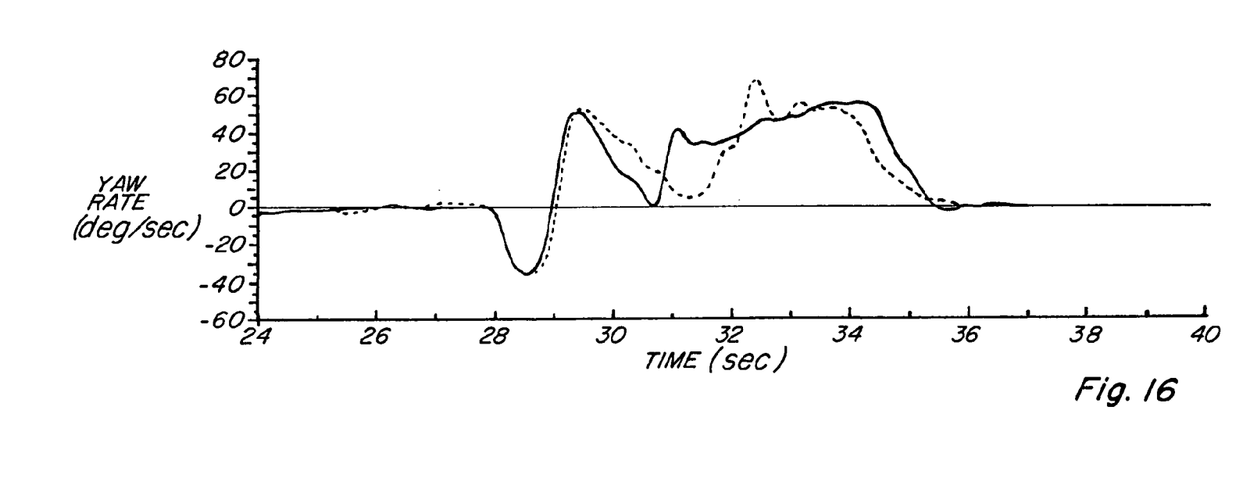
FIG. 16 is a graphical representation of the compared measured yaw rate of a test vehicle fitted with four conventional tires versus a test vehicle fitted with one of the tires constructed according to the present invention.
Figure 17:
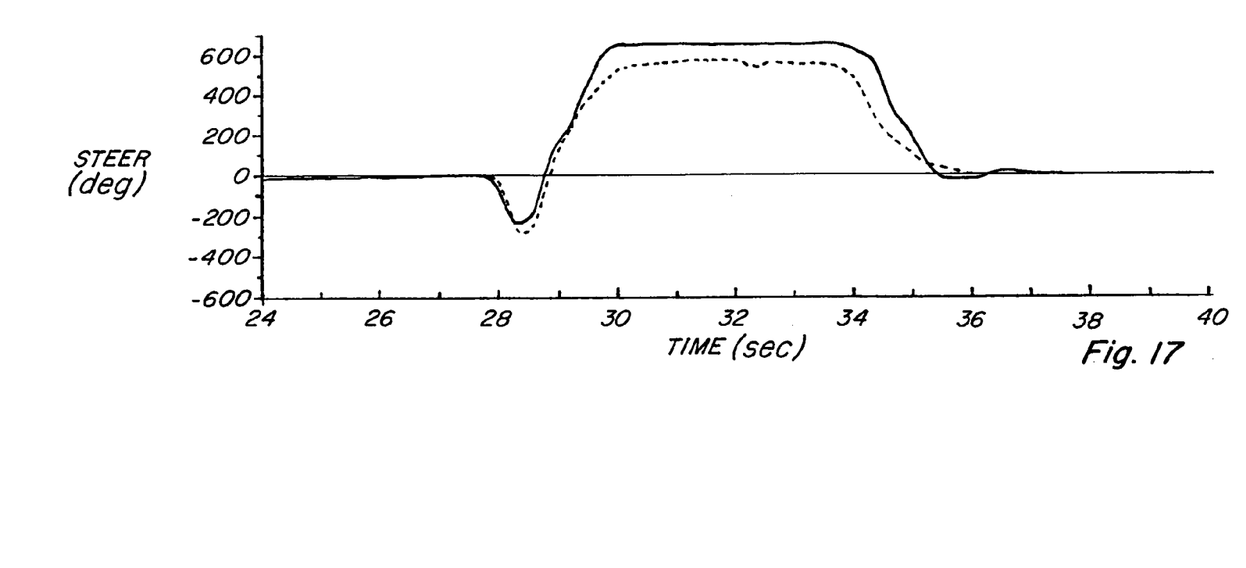
FIG. 17 is a graphical representation of the compared measured steer of a test vehicle fitted with four conventional tires versus a test vehicle fitted with one of the tires constructed according to the present invention.

FIG. 3 illustrates a perspective view of the tire 10 with only a portion of the tread 20 being shown and the portion 34 having a different configuration. The tread portion 20 has the shoulder 26 and the axially opposed shoulder 28. The shoulder 28 is shown to have the portion 34 of low friction material that is positioned in the shoulder 28 of the tread 20. The portion 34 presents the surface 36 toward the road in order for the surface 36 to contact the road to reduce frictional forces between the tire 10 and the road to prevent vehicle rollover or oversteer. Additionally, there may be a plurality of the shoulders 28 having a portion 34 as is shown in FIG. 3. Further, there may be a plurality of the shoulders 26 each having a portion 30 incorporated therein. The tire 10 also has the sidewall portion 18 and the bead portion 14. The tread 20 has the various grooves 38 and the ribs 40 that may extend circumferentially or laterally. As is known, the grooves 38 and the ribs 40 aid in evacuation of water and aid in providing traction and acceleration in a variety of operating conditions such as paved roads, mud, and snow.

The portion 34 is shown as being circular in shape. However, other shapes are contemplated and possible. For example, the portions 30 and 34 may be constructed of other shapes such as triangular, rectangular, polygon, or other geometric shape or combinations thereof. It is also possible to have more than one of the portions 30 or 34 in the shoulders. The portions 30 or 34 are also plug type devices or shapes that may be inserted into the shoulders 26 and 28, respectively, of a conventional tire to retrofit or modify existing tires. In particular, an existing tire may have some of the rubber removed from the shoulders 26 and 28 and then have the portions 30 and 34 inserted therein. The portions 30 and 34 may be held in place by adhesives, by frictional force, by screw threads formed in the portions 30 and 34, or by any other suitable manner. The portions 30 and 34 may be formed out of an ultra-high molecular weight polyethylene (UHMWPE) material. UHMWPE possesses a unique combination of physical and mechanical properties which enable it to perform well under rigorous conditions of wear and environment. UHMWPE has the highest known impact strength of any thermoplastic presently manufactured, has a very low coefficient of friction, and is highly resistant to abrasion. UHMWPE is also self-lubricating even at extremely low temperatures. It has a slippery, paraffin-like surface that is inherently antiadhesive. Other examples of a low friction material that may be employed for the portions 30 and 34 are polymers such as polyamide, fluoropolymers such as PTFE, polypropylene, Kevlar®, and nylon. It also possible and contemplated to use any of the following materials for the portions 30 and 34: nano ceramics; carbon silicon; other silicon compounds; silica; and near-frictionless carbon (NFC). Whatever material or combinations of materials that are selected for the low friction material, the coefficient of friction of that material will be less than 0.55.

Testing of the tire 10 was accomplished in the following manner. The tire 10 was constructed using a conventional tire, such as a tire manufactured by Michelin identified as LTX M+S and having a size of 235/75R15. The shoulder 28 was modified by inserting a total of 45 round-head machine screws comprised of a low friction material such as UHMWPE around the circumference of the tire 10. The heads of the screws provided the surface 36 that acts as a low-friction interface between the shoulder 28 and the road or pavement during severe test maneuvers to be performed. The screws were machined out of UHMWPE material since this material has a low-friction coefficient, is abrasion resistant, and is low cost. The screws were designed to penetrate into the shoulder 28 of the tread 20.

The test was used to compare the rollover resistance of a test vehicle equipped with four conventional tires versus its rollover resistance when only one modified tire constructed according to the present invention is employed. The vehicle used for testing purposes was a 2000 Ford Explorer XLT 4×2 4-door. The test maneuver performed was a "fishhook" maneuver that is widely utilized in rollover resistance testing and was recently endorsed by the National Highway Traffic Safety Administration (NHTSA) for its dynamic rollover testing program. The maneuver conducted during testing involved a hard steer to the left, the steering wheel was turned approximately 270 degrees, followed by a severe steer to the right, in which the wheel was rotated quickly until it was turned at least 500 degrees to the right relative to straight ahead. Tip-up, if it occurs during the fishhook, takes place during the second steer. A professional driver was employed to perform the test maneuvers.

The Explorer was ballasted to decrease the stability and enhance its likelihood of tip-up during the test maneuvers. Occupant ballast modules, simulating additional occupants in the vehicle, were placed in the front passenger seat and in the rear seat behind the driver. Additionally, ninety pounds of ballast was loaded on the roof. The stability index, a ratio of track width to center of gravity height used by NHTSA to generate its star ratings for rollover resistance, was calculated to be 2.02 for the Explorer as tested, a very low number that would have received the lowest possible star rating from NHTSA had the Explorer been rated using this loading configuration. To prevent complete vehicle rollover during testing, 14 foot aluminum outriggers were installed at the front and the rear of the Explorer to limit any potential tip-up to roughly 25 degrees of roll angle before rolling would be halted by the outriggers contacting the pavement.

The vehicle's tires were all size 235/75R15 that were inflated to 35 p.s.i. Firestone Wilderness AT tires were mounted on the rear wheels while Michelin LTX M+S tires were mounted on the front wheels in conducting the test where all of the tires were conventional. All tires were broken in prior to testing. The second test consisted of removing the front left tire and replacing it with the tire 10. The front left tire position was used because the second steer of the fishhook placed the greatest side forces on this position.

The test vehicle was outfitted with a data collection system consisting of a tri-axial accelerometer, two gyros for measuring yaw and roll rate, a linear steering potentiometer for measuring input steer angles, and a Doppler radar velocity sensor with a display mounted in front of the test driver. The unit containing the accelerometers and rate gyros was mounted at approximately the center of gravity of the vehicle. All instruments were within calibrated limits at the time of testing. Two digital video cameras were used to visually record the motion of the vehicle. One camera captured an overall view of the vehicle while the other camera focused on the left front tire area.

The first test maneuver was a control test conducted with the four conventional tires. The Explorer's entrance speed just prior to the first fishhook steer was 38.8 mph. During the second steer to the right, the Explorer tipped up to the left and reached a peak roll angle of approximately 24 degrees before the outriggers stopped the impending rollover.

After replacing the left front tire with the tire 10, the second test was conducted wherein the fishhook maneuver was repeated. The entrance speed with this test was 38.4 mph. During the second steer, the Explorer remained upright with a peak roll angle of only 9 degrees. FIGS. 4–17 are the data for the two tests that were conducted. In particular, the data reveals that towards the end of the critical second steer, the peak lateral g's and, more importantly, the sustained lateral g's with the tire 10 were noticeably lower than those using the conventional tires. During the second steer, both acceleration curves followed a pattern of a first peak, followed by a moderate drop-off and then a slightly higher second peak. For the first test, the vehicle reached a roll angle of about 18 degrees and was committed to tip-up within a ½ second of the first acceleration peak. As a comparison, the average lateral g level for the ½ second following the first peak was calculated for both tests. The difference was dramatic, as the first test was 0.73 g's compared to 0.60 g's for the second test.

The data demonstrates that the tire 10 had the surface 36 of the portion 34 engaged during the severe second steer and acted to diminish peak lateral forces and prevent potential rollover from occurring. Another effect of the tire 10, as seen from the data, was a moderate reduction in vehicle yaw rates during the second steer of the second test as compared to the second steer of the first test. This tendency towards understeer behavior was anticipated and is a further benefit in reducing vehicle rollover by allowing a driver to remain in control of the vehicle during emergency steering. Many rollovers are a direct result of excessive steering inputs from the driver that lead to oversteer behavior and partial or complete vehicle "spin-out." Maintenance of vehicle control will help to significantly curtail the incidence of both on-road and off-road rollovers.

Figure 18:
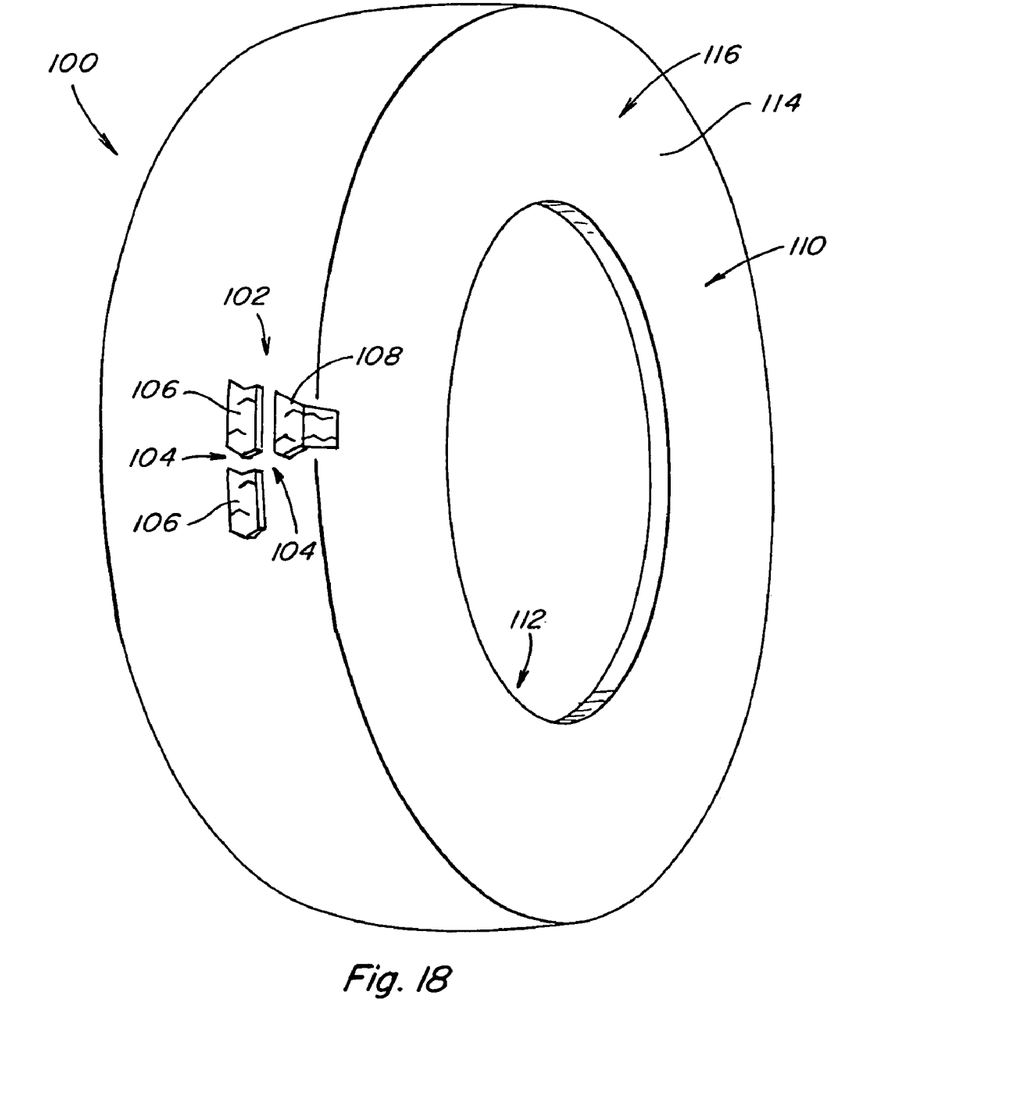
FIG. 18 is a perspective view of another preferred embodiment of a tire for preventing vehicle rollover or oversteer constructed according to the present invention with only a portion of the tread shown.

Referring now to FIG. 18, another preferred embodiment of a tire 100 for preventing vehicle rollover or oversteer is shown. The tire 100 has only a portion of a tread 102 depicted. The tread 102 has grooves 104 and ribs 106 which are formed in any desired pattern. The tread 102 also has a shoulder 108. Although not shown, there may be a plurality of grooves 104, ribs 106, and shoulders 108. The tire 100 also has a sidewall portion 110 and a bead portion 112. The sidewall portion 110 has a portion 114 of low friction material incorporated thereon or therein as part of the composition of the tire. The rubber compound from which the sidewall portion 110 is constructed may be manufactured with low friction material incorporated therein.

The portion 114 may cover the entire area of the sidewall portion 110 or a selected area thereof. For example, the portion 114 may be a concentric circle of predetermined diameters. The portion 114 presents a surface 116 toward the road in order for the surface 116 to contact the road to reduce frictional forces between the tire 100 and the road to prevent rollover of a vehicle. The portion 114 may also comprise a coating of low friction material that is applied during the manufacturing process or to a finished tire. The tire 100 also has another sidewall portion, which is not shown in FIG. 18, with such sidewall portion having a portion of low friction material incorporated therein or thereon as with the portion 114.

From all that has been said, it will be clear that there has thus been shown and described herein a tire for preventing vehicle rollover or oversteer which fulfills the various objects and advantages sought therefor. It will become apparent to those skilled in the art, however, that many changes, modifications, variations, and other uses and applications of the subject tire for preventing rollover or oversteer of a vehicle is possible and contemplated. All changes, modifications, variations, and other uses and applications which do not depart from the spirit and scope of the invention are deemed to be covered by the invention, which is limited only by the claims which follow.

What is claimed is:

1. A vehicle comprising a road-engaging tire and a wheel, said tire comprising:
    a pair of bead portions;
    a pair of sidewall portions;
    a tread portion; and
    the tire having a plurality of ribs and grooves that form (i) a radially outwardly facing tread surface and (ii) a side surface that extends radially inwardly of the radially outwardly facing tread surface,
    said tire being mounted on the wheel of the vehicle such that the tire directly contacts the road, and
    at least one of the ribs forming the side surface having low friction material that defines at least a portion of the side surface, wherein the rib forming said side surface is separated from a central region of the tread by a groove extending circumferentially of the tire, wherein a portion of the low friction material nearest the tread surface is spaced from the tread surface by a distance less than the depth of the groove extending circumferentially of the tire, and the low friction material is arranged to engage a road in response to side forces exerted on the tire and to reduce frictional forces between the tire and the road when the low friction material contacts the road, thereby minimizing vehicle rollover or oversteer.

2. The vehicle of claim 1 wherein a plurality of circumferentially spaced ribs have low friction material that define portions of the side surface.

3. The vehicle of claim 2 further comprising a second side surface at the other side of the tread surface and low friction material is positioned in at least one of the ribs that define portions of the second side surface.

4. The vehicle of claim 2 wherein the low friction material is molded into the tire.

5. The vehicle of claim 2 wherein the tire comprises rubber compound and the low friction material is incorporated into the rubber compound radially inwardly of the tread surface.

6. The vehicle of claim 2 wherein the low friction material is a coating applied to the tire.

7. A vehicle comprising a road-engaging tire and a wheel, said tire comprising:
    a pair of bead portions;
    a pair of sidewall portions; and
    a tread portion extending between the pair of sidewall portions,
    the tread portion having (i) a plurality of ribs and grooves defining a radially outwardly facing tread surface and (ii) a shoulder positioned at one side of the tread portion, the shoulder being radially between the radially outwardly facing tread surface and one of the pair of sidewall portions,
    said tire being mounted on the wheel of the vehicle such that the tire directly contacts the road, and
    the shoulder of the tread portion having low friction material that defines a side surface of the shoulder, wherein ribs forming said side surface are separated from a central region of the tread by a groove extending circumferentially of the tire, wherein a portion of the low friction material nearest the tread surface is spaced from the tread surface by a distance less than the depth of the groove extending circumferentially of the tire, and the low friction material is arranged to engage the road in response to side forces exerted on the tire and to reduce frictional forces between the tire and the road when the low friction material contacts the road, thereby minimizing vehicle rollover or oversteer.

8. The vehicle of claim 7 wherein the tread portion has a second shoulder at the opposite side of the tread surface radially between the tread surface and the other of the pair of sidewall portions and low friction material that defines a side surface of the second shoulder.

9. The vehicle of claim 7 wherein the portion of low friction material is molded into the shoulder of the tread portion.

10. The vehicle of claim 7 wherein the tire comprises rubber compound and the low friction material is incorporated into the rubber compound radially inwardly of the tread surface.

11. The vehicle of claim 7 wherein the low friction material is a coating applied to the shoulder.

12. The vehicle of claim 7 wherein the low friction material is ultra-high molecular weight polyethylene.

13. The tire of claim 7 wherein the low friction material is a fluoropolymer.

14. The vehicle of claim 7 wherein the low friction material is silicon material.

15. The vehicle of claim 7 wherein the low friction material is ceramic material.

16. The vehicle of claim 7 wherein the low friction material comprises an aromatic polyamide.

17. The vehicle of claim 7 wherein the low friction material is nylon.

18. The vehicle of claim 7 wherein at least one of the pair of sidewall portions comprises low friction material positioned radially inwardly of the low friction material of the shoulder of the tread portion and forming at least a portion of a side surface of the one sidewall portion.

* * * * *